US012726132B2

(12) United States Patent
Pai

(10) Patent No.: US 12,726,132 B2
(45) Date of Patent: Sep. 1, 2026

(54) HIGH VOLTAGE PULSE DELIVERY OVER LONG CABLES IN PULSED POWER SYSTEMS

(71) Applicant: Halliburton Energy Services, Inc., Houston, TX (US)

(72) Inventor: Nagaraja K. Pai, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 172 days.

(21) Appl. No.: 18/669,977

(22) Filed: May 21, 2024

(65) Prior Publication Data

US 2025/0364916 A1 Nov. 27, 2025

(51) Int. Cl.

*E21B 21/08* (2006.01)
*E21B 47/16* (2006.01)
*H02M 3/335* (2006.01)
*H02M 3/338* (2006.01)

(52) U.S. Cl.

CPC .......... *H02M 3/3387* (2013.01); *E21B 21/08* (2013.01); *E21B 47/16* (2013.01)

(58) Field of Classification Search

CPC . E21B 21/08; E21B 47/16; E21B 7/15; E21B 41/0085; H02M 3/3387; H02M 3/33576; H02M 3/003

See application file for complete search history.

(56) References Cited

U.S. PATENT DOCUMENTS 4,741,405 A 5/1988 Moeny et al.
8,186,454 B2 5/2012 Moeny
9,896,912 B2 2/2018 Tegeler et al.
10,407,995 B2 9/2019 Moeny
10,411,626 B2 9/2019 Rajagopalan
11,078,727 B2 8/2021 Gleitman et al.
11,280,171 B2 3/2022 Pai
11,326,399 B2 5/2022 Gleitman et al.
11,657,965 B2 5/2023 Wiecek et al.
11,680,447 B2 6/2023 Pai et al.
11,970,923 B2 4/2024 Aguiar et al.

(Continued)

FOREIGN PATENT DOCUMENTS

CA 3231158 5/2023
CA 3232370 5/2023

(Continued)

OTHER PUBLICATIONS

International Search Report and Written Opinion for International Patent Application No. PCT/US2024/033232 dated Feb. 17, 2025. PDF file. 9 pages.

(Continued)

*Primary Examiner* — Sisay G Tiku

(74) *Attorney, Agent, or Firm* — Benjamin Ford; C. Tumey Law Group PL

(57) ABSTRACT

Systems and Methods for providing power to downhole to a pulsed drilling scheme. For example, methods and systems herein may comprise a pulsed power drill bit comprising one or more electrodes, and a pulse-generating (PG) circuit configured to provide an electric potential across the one or more electrodes. In addition. a boost charger configured to charge an energy storage component in the PG circuit and a power supply configured to provide voltage to the PG circuit.

19 Claims, 5 Drawing Sheets

(56) References Cited

U.S. PATENT DOCUMENTS

| | | | | |
|---|---|---|---|---|
| 12,104,466 | B2 | 10/2024 | Finke et al. | |
| 12,173,586 | B2 | 12/2024 | Finke et al. | |
| 2004/0154540 | A1 | 8/2004 | Hayami et al. | |
| 2006/0037779 | A1 | 2/2006 | Moeny et al. | |
| 2006/0038437 | A1 | 2/2006 | Moeny | |
| 2007/0137893 | A1 | 6/2007 | Moeny et al. | |
| 2007/0194759 | A1 | 8/2007 | Shimizu et al. | |
| 2008/0185184 | A1 | 8/2008 | Maguire | |
| 2008/0245568 | A1 | 10/2008 | Jeffryes | |
| 2011/0275521 | A1 | 11/2011 | Stemmle et al. | |
| 2014/0131044 | A1 | 5/2014 | Parsche | |
| 2016/0326806 | A1 | 11/2016 | Lund et al. | |
| 2018/0148981 | A1 | 5/2018 | Moeny | |
| 2018/0287533 | A1 | 10/2018 | Rajagopalan | |
| 2018/0313158 | A1 | 11/2018 | Gilbrech | |
| 2019/0316419 | A1 | 10/2019 | Bayol et al. | |
| 2020/0063543 | A1* | 2/2020 | Pai | E21B 7/15 |
| 2020/0224520 | A1 | 7/2020 | Curlett | |
| 2020/0370375 | A1 | 11/2020 | Gleitman et al. | |
| 2021/0025240 | A1 | 1/2021 | Moeny | |
| 2021/0324683 | A1 | 10/2021 | Gleitman et al. | |
| 2022/0195806 | A1 | 6/2022 | Pai et al. | |
| 2022/0195866 | A1 | 6/2022 | Sedano | |
| 2023/0132937 | A1 | 5/2023 | Finke et al. | |
| 2023/0143504 | A1 | 5/2023 | Finke et al. | |
| 2023/0144439 | A1 | 5/2023 | Finke et al. | |
| 2023/0145343 | A1 | 5/2023 | Finke et al. | |
| 2025/0034946 | A1* | 1/2025 | Pai | E21B 41/0085 |
| 2025/0075569 | A1* | 3/2025 | Pai | E21B 7/15 |
| 2025/0084706 | A1* | 3/2025 | Pai | E21B 19/22 |
| 2025/0237110 | A1* | 7/2025 | Pai | E21B 7/15 |
| 2025/0240001 | A1* | 7/2025 | Pai | E21B 7/15 |

FOREIGN PATENT DOCUMENTS

| | | | | |
|---|---|---|---|---|
| CN | 102733754 | A | 10/2012 | |
| CN | 111119739 | | 5/2020 | |
| CN | 117588158 | A | 2/2024 | |
| EP | 0497420 | | 8/1992 | |
| EP | 3508683 | | 11/2020 | |
| EP | 3739163 | | 11/2020 | |
| WO | 2005124213 | | 12/2005 | |
| WO | 2014145259 | | 9/2014 | |
| WO | 2019245544 | | 12/2019 | |
| WO | 2020236189 | | 11/2020 | |
| WO | 2022140719 | | 6/2022 | |
| WO | WO-2025023978 | A1 * | 1/2025 | E21B 17/023 |
| WO | WO-2026029837 | A1 * | 2/2026 | E21B 36/001 |

OTHER PUBLICATIONS

International Search Report and Written Opinion for International Patent Application No. PCT/US2025/042067 dated Jan. 19, 2026. PDF file. 8 pages.

"Extended European Search Report for 22893818.9", Feb. 3, 2025, 9 pages.

"PCT Application No. PCT/US2022/079577, International Preliminary Report on Patentability", May 23, 2024, 7 pages.

"PCT Application No. PCT/US2022/079577, International Search Report and Written Opinion", Mar. 9, 2023, 11 pages.

"PCT Application No. PCT/US2022/079580, International Preliminary Report on Patentability", May 23, 2024, 8 pages.

"PCT Application No. PCT/US2022/079580, International Search Report and Written Opinion", Mar. 15, 2023, 14 pages.

"PCT Application No. PCT/US2022/079581, International Preliminary Report on Patentability", May 23, 2024, 6 pages.

"PCT Application No. PCT/US2022/079581, International Search Report and Written Opinion", Mar. 15, 2023, 12 pages.

"PCT Application No. PCT/US2022/079583, International Preliminary Report on Patentability", May 23, 2024, 7 pages.

"PCT Application No. PCT/US2022/079583, International Search Report and Written Opinion", Mar. 10, 2023, 12 pages.

"PCT Application No. PCT/US2023/071164, International Search Report and Written Opinion", Apr. 18, 2024, 13 pages.

"PCT Application No. PCT/US2024/054615 International Search Report and Written Opinion", Mar. 20, 2025, 10 pages.

"U.S. Appl. No. 17/982,589, Non-Final Office Action", Dec. 29, 2023, 12 pages.

"U.S. Appl. No. 17/982,739, Final Office Action", Jun. 12, 2024, 10 pages.

"U.S. Appl. No. 17/982,739, Non-Final Office Action", Dec. 14, 2023, 10 pages.

"U.S. Appl. No. 17/982,789, Non-Final Office Action", Dec. 22, 2023, 7 pages.

"U.S. Appl. No. 18/359,761 Final Office Action", Mar. 5, 2025, 12 pages.

"U.S. Appl. No. 18/359,761 Final Office Action", Aug. 2, 2024, 10 pages.

"U.S. Appl. No. 18/359,761 Non Final Office Action", Jun. 5, 2024, 9 pages.

"U.S. Appl. No. 18/359,761 Non-Final Office Action", Nov. 6, 2024, 10 pages.

Paramane, et al., "A Review on Insulation and Dielectrics for High-Temperature Superconducting Cables for Power Distribution: Progress, Challenges, and Prospects", IEEE Transactions on Applied Superconductivity, vol. 33, No. 6, Sep. 2023, Sep. 2023, 31 pages.

* cited by examiner

HIGH VOLTAGE PULSE DELIVERY OVER LONG CABLES IN PULSED POWER SYSTEMS

BACKGROUND

Pulse power drilling in subterranean formations involves using a drill bit on which, for example, one or more sets or pairs of electrodes are disposed. The pairs of electrodes may be oriented along a face of the drill bit and disposed with a gap between each electrode in a set. In other words, the electrodes between which an electrical current pass through a mineral substrate (e.g., rock) are not on opposite sides of the rock. The passage of the electrical current between the electrodes of a set and through the rock causes it to break up. This process causes the rock to be broken up into monomineralic grains. The process generally results in the faster generation of more and finer monomineralic grains than with purely mechanical drilling processes.

In conventional rotary bit drilling, a drilling fluid is used, among other purposes, as a lubricant for the rotary drill bit and to carry drill cuttings. Pulse power drilling, on the other hand, uses fundamentally different technology than rotary bit drilling to break apart rock and the drilling fluid used in pulse power drilling may serve other functions. Pulse power drilling fluid may be pumped through the downhole tool at the bottom of the wellbore being drilled and up through the annulus between the drill string and the wellbore. As with rotary bit drilling, the pulse power drilling fluid may bring drill cuttings upward through the annulus and may provide a hydrostatic head to prevent a blowout. Accordingly, a pulsed power drilling fluid will preferably have a high dielectric constant, low conductivity, high dielectric strength, and a long life under industrial or military application environments.

The current scheme of the pulsed power drilling tool consists of a medium voltage power supply at the surface and a bottom holes assembly (BHA) consisting of booster, charger and a pulsed power converter. There are multiple challenges present in the current system. For example, packaging of dual power conversion stages and resonant power transfer across the Tesla transformer may result in dramatic losses in power and require complex BHA designs. The more complex a BHA design the less maneuverable and robust it may be. This may lead to constraints to well plans and effective reservoir outreach. Additionally, it may be challenging for downhole components to isolate high voltages and electrical field concentrations from magnetically permeable formations. Further current scheme of the pulsed power drilling tool is required to is inherently susceptible to large amount of power losses which need to be transferred to contain temperature rise.

BRIEF DESCRIPTION OF THE DRAWINGS

These drawings illustrate certain aspects of the present disclosure and should not be used to limit or define the disclosure.

DETAILED DESCRIPTION

Methods and systems herein may generally relate to methods and systems for transmitting power downhole for a pulsed power drilling scheme. Methods and systems herein split a traditional pulsed power system in such a way that most of the converter section is moved to the surface. The implementation of only a secondary capacitor and an output diode along with sensing electronics are assembled in the BHA just above the drill bit. This implementation swaps the voltage converter from a downhole position to a positioned at the surface. Additionally, a high voltage cable may support more than replaces the current medium voltage cable. Herein, medium voltage (MV) may be between 100V-1 kV, 1 kV-10 kV, or 10 kV-100 kV. Additionally, high voltage (HV) may be between 1 kV-10 kV, 10 kV-100 kV, or 100 kV-1,000 kV.

Figure 1:
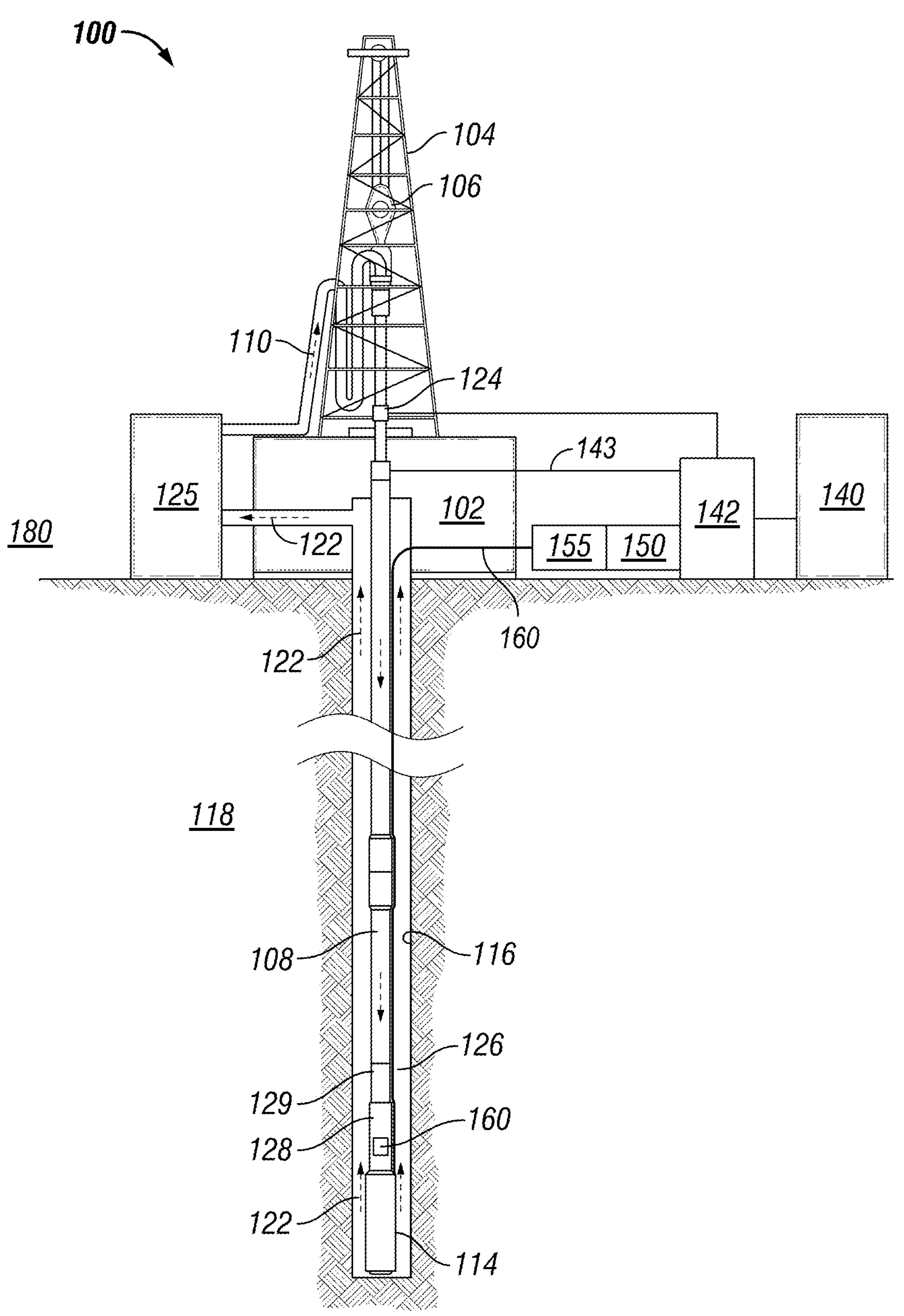
FIG. 1 illustrates an exemplary pulsed power drilling system used to form a wellbore in a subterranean formation.

FIG. 1 illustrates an exemplary pulsed power drilling (PPD) system 100 used to form a wellbore in a subterranean formation. Although FIG. 1 shows land-based equipment, downhole tools incorporating teachings of the present disclosure may be satisfactorily used with equipment located on offshore platforms, drill ships, semi-submersibles, and drilling barges (not expressly shown). Additionally, while wellbore 116 is shown as being a generally vertical wellbore, wellbore 116 may be any orientation comprising generally horizontal, multilateral, or directional.

PPD system 100 comprises drilling platform 102 that supports derrick 104 having traveling block 106 for raising and lowering drill string 108. Drill string 108 may be raised and lowered using a draw-works, such as a machine on the rig comprising a large diameter spool (not shown) of wire rope. The draw-works may be driven by a power source, such as an electric motor (not shown), or hydraulically to spool-in the wire rope to raise the drill string. The draw-works may be able to spool-out the wire rope to lower the drill string under the force of gravity acting on the drill string within the wellbore. The draw-works may comprise a brake to control the lowering of the drill string. The draw-works may comprise a crown block which, together with traveling block 106, form a block and tackle with several windings of the wire rope between them for mechanical advantage. Sensors may be mounted on or proximate to the draw-works spool to measure the rotation, from which changes in the depth of the drill string may be calculated. Time may also be measured and, together with the calculations of changes in depth, may enable the calculation of instantaneous and average rates of penetration (ROP). PPD system 100 may also comprise pump 125, which circulates drilling fluid 122 (also called "mud") through a feed pipe to kelly 110, which in turn conveys drilling fluid 122 downhole through interior channels of drill string 108 and through one or more fluid flow ports in pulsed-power drill bit 114. Drilling fluid 122 circulates back to the surface via annulus 126 formed between drill string 108 and the sidewalls of wellbore 116. Herein, surface may be referred to any location not immediately within wellbore 116. The surface may comprise a drilling platform, adjacent area surrounding the drilling platform, or any land or structure relevant to hydrocarbon extraction. Fractured portions of the formation (also called "cuttings") are carried to the surface by drilling fluid 122 to remove those fractured portions from wellbore 116. Drilling fluid 122 and cuttings returning from downhole to the surface may flow over a shale shaker or another device that removes the cuttings from drilling fluid 122. The portion of drilling fluid 122 returned from downhole to the surface may be collected in surface tanks and may be tested by personnel or through automated fluid management systems, after which an adjustment to drilling fluid may be initiated. For example, a person or automated system may examine, and subsequently initiate an adjustment to, properties of drilling fluid 122 that may have changed as a result of processes in wellbore 116. Sensors may be employed at the surface, e.g., at the shale shaker or along the flow lines through which drilling fluid 122 is returned to the surface, to examine the properties of the cuttings and drilling fluid 122 returned to the surface. Gas entrained in drilling fluid 122 or cuttings may be captured and analyzed by personnel or the volume and/or other characteristics of the entrained gas may be directly measured by sensors at the surface.

Drilling fluid 122 may have rheological properties for removing cuttings from wellbore 116. Drilling fluid 122 may also have electrical properties conducive to particular PPD operations. Drilling fluid 122 may be or comprise oil-based fluids or water-based fluids, depending upon the particular pulsed power drilling approach used. Drilling fluid 122 may be formulated to have high dielectric strength and a high dielectric constant, so as to direct electrical arcs into the formation rather than them being short circuited through drilling fluid 122.

PPD system 100 may comprise valve 124 at the surface. The opening and closing of valve 124 may be controlled to create pressure pulses, sometimes referred to as mud pulses, in drilling fluid 122 that convey commands or other information to various downhole components. The pressure pulses, or mud pulses, may be sensed by a sensor at the BHA, e.g., a pressure sensor ported to the flow path of drilling fluid 122 through the BHA tubular elements. The resulting sensor signals may inform or be translated (e.g., by a processor) into commands used in controlling a PPD operation. The resulting sensor signals may be translated by various actuators into other types of control signals used to control a PPD operation.

Valve 124 may be positioned anywhere along the flow path of drilling fluid 122 from mud pump 125 to kelly 110. In one example, valve 124 may be in-line with the flow path and may, when activated, cause or relieve a restriction in the flow path to create mud pulses. In another example, valve 124 may be positioned to vent or bypass a portion of drilling fluid 122 or to make a change to a bypass from the main flow path of drilling fluid 122 to kelly 110 and drill string 108 to create mud pulses. Herein, drill string 108 is illustrated in FIG. 1. However, any other embodiment of downhole pipe may be employed and interchangeable with drill string 108 comprising at least coiled tubing. In this example, the portion of drilling fluid 122 vented using valve 124 may then be returned by other pipes or tubular elements to mud tanks on the surface or to an inlet of mud pump 125. Valve 124 may comprise a solenoid or other mechanism for activation and may be controlled using an electrical signal input or a digital command.

Valve 124 may comprise a rotor and stator within the path of drilling fluid 122 to create periodic brief interruptions or restrictions in the flow of drilling fluid 122 as the turbine vanes cross the openings between the stator vanes. The rotor speed may be modulated (e.g., via electrical or mechanical braking) using an electrical control system, thus changing the periodicity or frequency of the interruptions and corresponding perturbations or pulses within drilling fluid 122.

Pulsed-power drill bit 114 is attached to the distal end of drill string 108 and may be an electrocrushing drill bit or an electrohydraulic drill bit. Power may be supplied to pulsed-power drill bit 114 from components downhole, components at the surface and/or a combination of components downhole and at the surface. For example, generator 140 may generate electrical power and provide that power to power-conditioning unit 142. Power-conditioning unit 142 may then transmit electrical energy downhole via surface cable 143 and a sub-surface cable (not expressly shown in FIG. 1) contained within drill string 108 or attached to the outer wall of drill string 108. A pulse-generating (PG) circuit 160 within BHA 128 may receive the electrical energy from power-conditioning unit 142 and may generate high-energy electrical pulses to drive pulsed-power drill bit 114. The high-energy electrical pulses may discharge through the rock formation and/or drilling fluid 122 and may provide information about the properties of the formation and/or drilling fluid 122. PG circuit 160 may be disposed on BHA 128 and may be located near pulsed-power drill bit 114. PG circuit 160 may comprise a power source input, comprising two input terminals, and a first capacitor coupled between the input terminals. The pulsed generating circuit may comprise a first inductor coupled between the input terminals with associated opening switch and a first capacitor coupled to the two ends of the inductor. In examples, the PG circuit 160 may comprise a switch, a transformer, and a second capacitor whose terminals are coupled to respective electrodes of pulsed-power drill bit 114. The switch may comprise a mechanical switch, a solid-state switch, a magnetic switch, a gas switch, or any other type of switch suitable to open and close the electrical path between the power source input and a first winding of the transformer. To be discussed below, there may be more examples of PG circuit 160.

Pulse-generating (PG) circuit 160 within BHA 128 may be utilized to repeatedly apply a large electric potential across the electrodes of pulsed-power drill bit 114. For example, the applied electric potential may be in the range of 150 kV to 300 kV or higher. In this example, the lower bound on the applied electric potential may correspond to a lower bound on pulsed current of 500 amps. In another example, the lower bound on the applied electric potential may be 80 kV, with a lower bound on pulsed current of 500 amps In yet another example, the lower bound on the applied electric potential may be 60 kV, again with a lower bound on pulsed current of 500 amps. Each application of electric potential is referred to as a pulse. The high-energy electrical pulses generated by PG circuit 160 may be referred to as pulsed drilling signals. When the electric potential across the electrodes of pulsed-power drill bit 114 is increased enough during a pulsed to generate a sufficiently high electric field, an electrical arc forms through rock formation 118 at the distal end of wellbore 116. The arc temporarily forms an electrical coupling between the electrodes of pulsed-power drill bit 114, allowing electric current to flow through the arc inside a portion of rock formation 118 at the distal end of wellbore 116. The arc greatly increases the temperature and pressure of the portion of the rock formation 118 through which the arc flows and the surrounding rock formation 118 and materials. The temperature and pressure are sufficiently high to break the rock into small bits referred to as cuttings. This fractured rock is removed, typically by drilling fluid 122, which moves the fractured rock away from the electrodes and uphole. The terms "uphole" and "downhole" may be used to describe the location of various components of PPD system 100 relative to pulsed-power drill bit 114 or relative to the distal end of wellbore 116 shown in FIG. 1. For example, a first component described as uphole from a second component may be further away from pulsed-power drill bit 114 and/or the distal end of wellbore 116 than the second component. Similarly, a first component described as being downhole from a second component may be located closer to pulsed-power drill bit 114 and/or the distal end of wellbore 116 than the second component.

The electrical arc may also generate acoustic and/or electromagnetic waves that are transmitted within rock formation 118 and/or drilling fluid 122. Sensors placed within wellbore 116 and/or on the surface may record responses to high-energy electrical pulses, acoustic waves and/or electromagnetic waves. Sensor analysis system (SAS) 150 may, during PPD operations, receive measurements representing the recorded responses and may analyze the measurements to determine characteristics of rock formation 118 or for other purposes. PPD system 100 may also comprise mud pulsed valve 129 downhole. The opening and closing of mud pulsed valve 129 may be controlled to create pressure pulses in drilling fluid 122 that convey information to various components on the surface. In one example, an optical fiber may be positioned inside a portion of wellbore 116 and a distributed acoustic sensing subsystem may sense the pressure pulses based on changes in strain on the optical fiber and translate them into electrical signals that are provided to sensor analysis system (SAS) 150, Other types of pressure sensing mechanisms at the surface may detect the pressure pulses and translate them into electrical signals that are provided to SAS 150. Pulsed drilling controller (PDC) 155 may determine that a current operating parameter of a PPD operation should be modified based on the analysis performed by SAS 150 and may output a control signal to adjust a configurable downhole components (CDCs) that directly or indirectly affects the operating parameter to be modified.

Wellbore 116, which penetrates various subterranean rock formations 118, is created as pulsed-power drill bit 114 repeatedly fractures the rock formation and drilling fluid 122 moves the fractured rock uphole. Wellbore 116 may be any hole formed in a subterranean rock formation 118 or series of subterranean rock formations 118 for the purpose of exploration or extraction of natural resources such as, for example, hydrocarbons, or for the purpose of injection of fluids such as, for example, water, wastewater, brine, or water mixed with other fluids. Additionally, wellbore 116 may be any hole formed in a subterranean formation or series of subterranean formations for the purpose of geothermal power generation.

Although pulsed-power drill bit 114 is described above as implementing electrocrushing drilling, pulsed-power drill bit 114 may also be used for electrohydraulic drilling. In electrohydraulic drilling, rather than generating an electrical arc within the rock, pulsed-power drill bit 114 applies a large electrical potential across the one or more electrodes to form an arc across the drilling fluid proximate to the distal end of wellbore 116. The high temperature of the arc vaporizes the portion of the drilling fluid immediately surrounding the arc, which in turn generates a high-energy shock wave in the remaining fluid. The electrodes of electrohydraulic drill bit may be oriented such that the shock wave generated by the arc is transmitted toward the distal end of wellbore 116. When the shock wave contacts and bounces off of the rock at the distal end of wellbore 116, the rock fractures. Accordingly, wellbore 116 may be formed in subterranean formation 118 using pulsed-power drill bit 114 that implements either electrocrushing or electrohydraulic drilling. The circuit topologies used for electrohydraulic drilling may be the same as, or similar to, those used for electrocrushing drilling with at least some components of the circuits having different values.

SAS 150 may be positioned at the surface for use with PPD system 100 as illustrated in FIG. 1, or at any other suitable location. Any suitable telemetry mechanism (not illustrated) may be used for communicating signals between downhole components and surface-based components. For example, telemetry mechanism may be used for communicating signals from various acoustic, electrical or electromagnetic sensors at the surface or downhole to SAS 150 during a PPD operation. Telemetry mechanism may comprise an optical fiber that extends downhole in wellbore 116 and SAS 150 may be coupled to the optical fiber. The optical fiber may be enclosed within a cable, rope, line, or wire. More specifically, the optical fiber may be enclosed within a slickline, a wireline, coiled tubing, or another suitable conveyance for suspending a downhole tool in wellbore 116. The optical fiber may be charged by a laser to provide power to PDC 155, SAS 150, or sensors located within wellbore 116. More specifically, one or more input/output interfaces of SAS 150 may be coupled to the optical fiber for communication to and from acoustic, electrical or electromagnetic sensors positioned downhole. For example, the sensors may transmit measurements to SAS 150. Any suitable number of SASs 150, each of which may be coupled to an optical fiber located downhole, may be placed inside or adjacent to wellbore 116.

PDC 155 may be positioned at the surface for use with PPD system 100 as illustrated in FIG. 1, or at any other suitable location. Any suitable telemetry mechanism may be used for exchanging information by communicating acoustic, electrical or electromagnetic signals to or from PDC 155 during a PPD operation. More specifically, one or more input/output interfaces of PDC 155 may be configured for communication to or from various electrical, mechanical, or hydraulic components located downhole during a PPD operation. For example, PDC 155 may be coupled to telemetry mechanism, which may comprise an optical fiber that extends downhole in wellbore 116.

A variety of types of telemetry mechanisms may be suitable for use in communicating commands from the surface to downhole components of PPD system 100 ("downlinks") and for communicating data from downhole components of PPD system 100 or other BHA elements to the surface ("uplinks"). Telemetry mechanism may represent uplinks and/or downlinks associated with any suitable telemetry mechanism. In some example PPD systems 100, one type of telemetry mechanism may be used for downlinks and another type of telemetry mechanism may be used for uplinks. In some example PPD systems 100, a single type of telemetry may be used for both downlinks and uplinks. In some example PPD systems 100, telemetry may be provided in only one direction (e.g., for downlinks or uplinks, but not both). In some example PPD systems 100, one type of telemetry may be used for a portion of the travel path of the uplinks and/or downlinks, and another type of telemetry may be used for another portion of the travel path of the uplinks and/or downlinks, with suitable couplers being comprised at the interface between the two portions of the travel path. Suitable telemetry mechanism comprise the mud pulsed telemetry mechanism described above, which may be used for uplinks and/or downlinks.

Acoustic telemetry may be employed for uplinks and/or downlinks. For example, piezo or other devices may be coupled to drill string 108 at or near one end to create acoustic signals that travel along drill string 108, and other piezo or other devices may be coupled to drill string 108 at or near the opposite end of drill string 108 to receive the acoustic signals. Repeaters may be employed along drill string 108 to receive and re-launch the acoustic signals.

Electromagnetic (EM) telemetry may be employed for uplinks and/or downlinks. EM telemetry mechanism may utilize a relatively low frequency (e.g., 1 to 100 Hz) signal created using an antenna subsystem with an insulative gap in the BHA to communicate an electromagnetic signal from a location downhole to the surface. Drill string 108 and its casing may serve as one conductor and the formation may serve as the other conductor. The EM signal may be sensed at the surface by measuring voltage and/or current between the drill string casing or other connected conductive elements at the surface and an electrode coupled to the formation. An EM signal may be communicated from the surface to downlink by applying a low frequency signal between the two surface contact points, and may be sensed downhole by measuring voltage and/or current across the insulative gap of the antenna sub.

Uplinks and downlinks may be provided by a wire conveyed between the surface and one or more downhole components. Suitable implementations of this approach comprise running a wireline down the center of or along the outside of drill string 108. A wired pipe approach may utilize wire that is integral with the drill pipe and inductive couplings between sections of drill pipe. This wired pipe approach may be used for uplinks and/or downlinks.

PDC 155 may determine whether or when modifications should be made to the operating parameters of a PPD operation and may initiate the adjustment of CDCs that directly or indirectly affect any operating parameters that are to be modified without the need for those components to be removed from wellbore 116. For example, PDC 155 may initiate real-time adjustments to CDCs of a PPD system in response to changing conditions during a drilling operation. By making real-time adjustments, the number of times that all or a portion of drill string 108 is removed from wellbore 116 may be reduced and the ROP achieved during PPD operations may be improved.

Figures 4, 5:
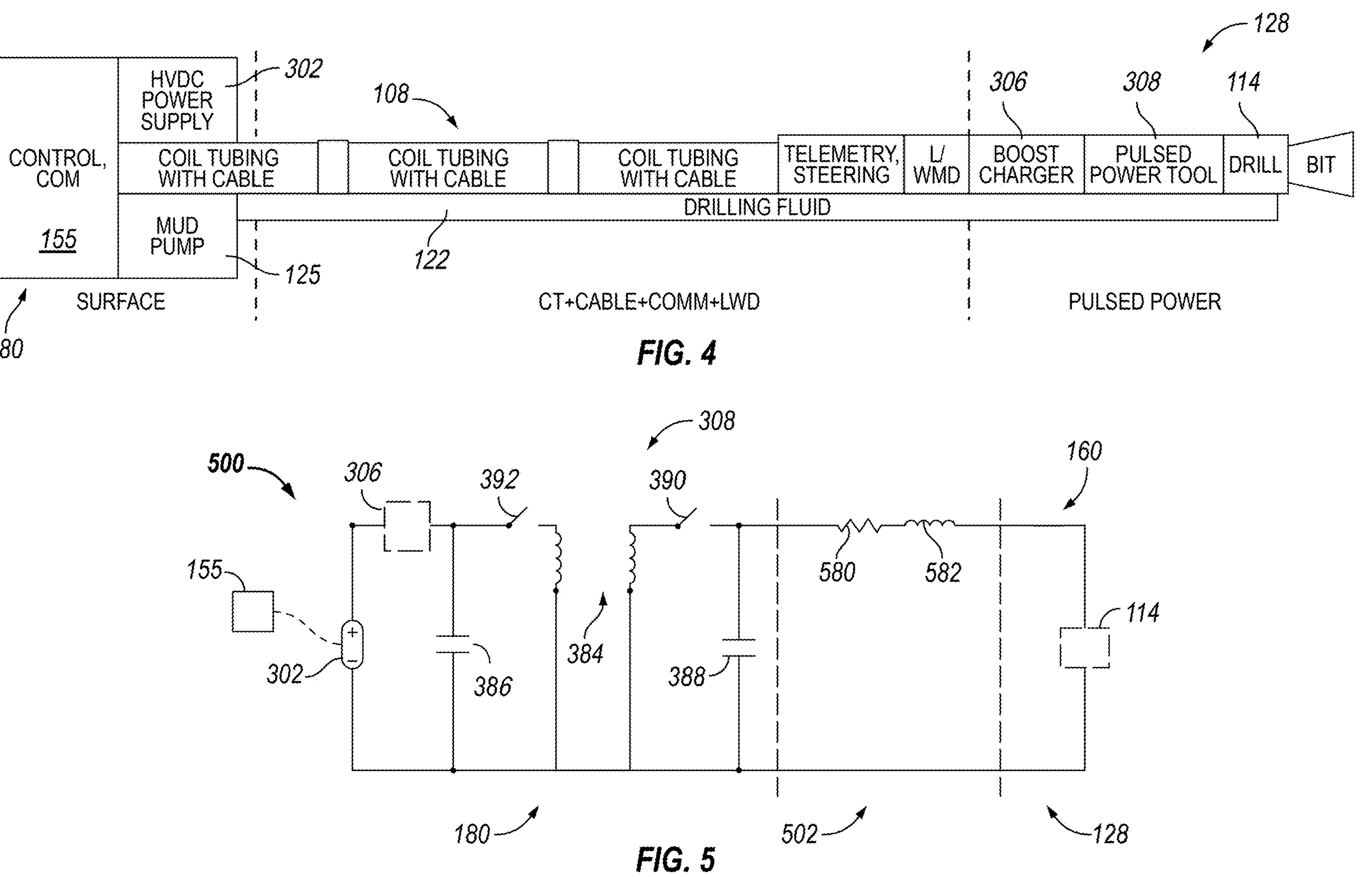
FIG. 4 illustrates a schematic for an example pulsed power drill system.
FIG. 5 illustrates an example of a pulsed power drill system with a high voltage cable.

PDC 155 may be coupled to, or otherwise in communication with, SAS 150. Alternatively, the functionality of SAS 150 may be integrated within PDC 155, with PDC 155 acting as a master controller for PPD operations. An example PDC that comprises an integrated SAS is illustrated in FIG. 5 and described below. Signal or informational inputs to PDC 155 may comprise measurements received from both downhole and surface sensors, or results of calculations made based on those measurements, indicating ROP, characteristics of cuttings, characteristics of drilling fluid 122 returning from downhole to the surface and/or entrained gas; downhole measurements of hole caliper or quality, vibration, or other wellbore characteristics; formation measurements; fluid pressure measurements; wellbore direction measurements; wellbore tortuosity or dogleg severity; and measurements of parameters within the pulsed-power tool itself, such as power draw, voltages, currents, frequencies, or wave forms measured within the tool at various sensing points, some of which may be associated with one or more particular electronic components.

The downhole operating environment is typically a high temperature environment, and the temperature may affect the performance, survival, and required maintenance cycles of the various electronic and other components of a pulsed-power tool. In addition, the operation of these components for pulsed power drilling may generate heat and may further raise the temperature of the environment and the components themselves. The temperature of a pulsed-power tool may be measured at one or more locations. Temperature measurements for a pulsed-power tool may be obtained using temperature sensors coupled to or proximate to particular electronic components of the pulsed-power tool. These temperature measurements may be useful for controlling operations in accordance with operating and/or survival specifications and intended operating points, for calculating component efficiency and/or for detecting incipient failure.

Inputs to PDC 155 may comprise modeled or otherwise calculated targets for one or more operating parameters of a PPD operation. Inputs to PDC 155 may comprise user specified target values for one or more operating parameters of a PPD operation.

Operating parameters of a PPD operation may be modified by adjusting one or more CDCs. The adjustments may be made using electrical components, such as by activating or deactivating solid state switches, using electromechanical components, e.g., by controlling relays, or using purely mechanical components, such as by mechanically toggling a device from one state to a second or subsequent state. As previously described PG circuit 160 may comprise a switch, a transformer, and a second capacitor whose terminals are coupled to respective electrodes of pulsed-power drill bit 114. However, further examples may be provided below.

Figure 2:
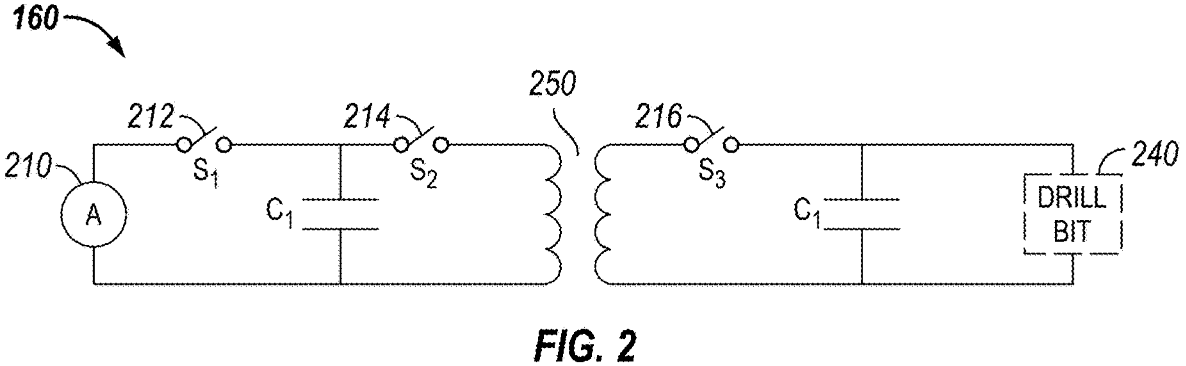
FIG. 2 illustrates an example of pulse-generating (PG) circuit.

FIG. 2 illustrates an example of PG circuit 160. In examples, downhole power supply system 200 may comprise a boost charger 210 configured to boost medium voltage to high voltage for downhole power supply circuit 200. In addition, downhole power supply circuit 200 may comprise charge control switch 212, pulsed start switch 214, and pulsed stop switch 216. When pulsed charge switch 212 is closed and pulsed start switch 214 is open, capacitor $C_0$ may be charged by boost charger 210. When charge control switch 212, pulsed start switch 214, and pulsed start switch 216 close, current from boost charger 210 and capacitor $C_0$ r may be discharged across transformer 250 and to capacitor $C_1$ and drill bit 240. Current within capacitor $C_1$ may build up until a voltage arches through drill bit 240 and into rock formation 118. Once voltage arches into rock formation 118, current withing capacitor $C_1$ may discharge to drill bit 240.

Figure 3:
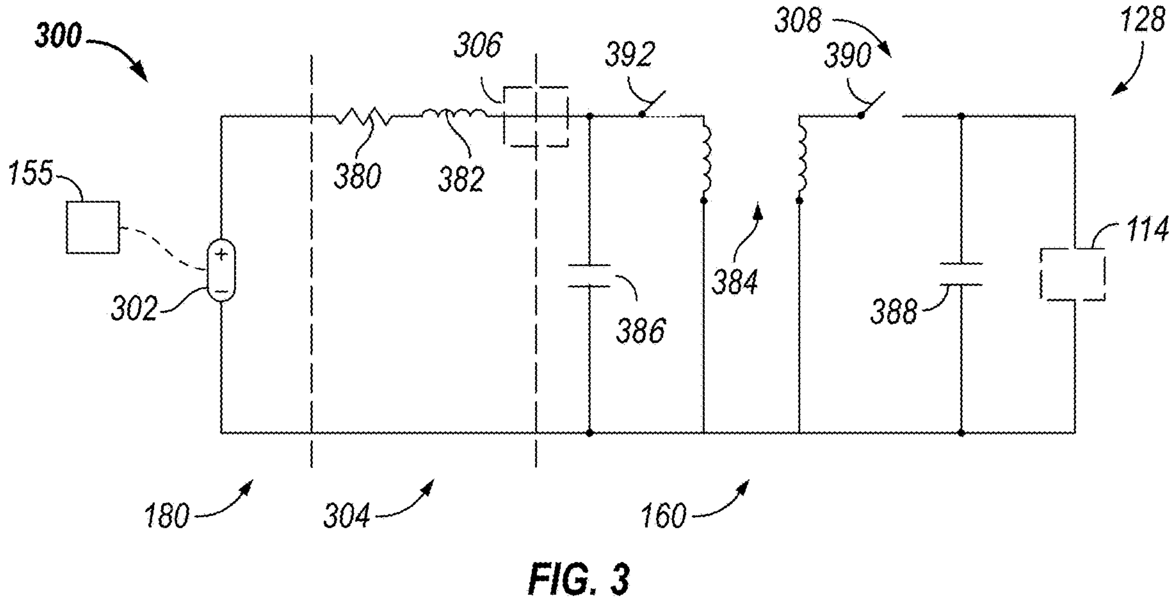
FIG. 3 illustrates an example of a pulsed power drill system.

FIG. 3 illustrates an example of a pulsed power drill system 300 comprising a PG circuit 160. DC power source 302 may be communicatively coupled to pulsed drilling controller (PDC) 155. Herein, DC power source 302 may be disposed on surface 180 and configured to produce a voltage across medium voltage (MV) cable 304. DC power source 302 may produce an MV voltage into MV cable 304. MV cable 304 may provide an electrical connection between surface 180 and PG circuit 160. In addition, MV cable may comprise a first inductance 382 and first resistance 380. The resulting voltage along MV cable 304 provides power on BHA 128 for PG circuit 160. The power provided by downhole to PG circuit 160 may be input into boost charger 306.

Boost charger 306 may increase the voltage to high voltage and inputs the high voltage into pulsed power circuit 308. Boost charger 306 may be operated with a switching element configured to switch the mode of boost charger 306. In examples, the switching element may implement any example of a transistor comprising but not limited to a MOSFET or a BJT. In other examples, the switching element may be any element configured to switch the mode of boost charger 306. When the switching element activates a charging mode for boost charger 306, an inductor may be utilized within boost charger 306 to store and release power between different modes of boost charger 306. In addition, boost charger 306 may implement a capacitor to regulate changes in voltage when boost charger 306 is switching between modes. Further, boost charger 306 may incorporate a control circuitry configured to be connected to and controlled by PDC 155. Moreover, boost charger 306 may utilize a transformer. In effect, the component of boost charger 306 may be utilized to receive voltage from DC power supply 302 and output an increased voltage. The increased voltage may be implemented by pulsed power circuit 308.

For example, pulsed power circuit 308 may create pulses of voltage with secondary switch 390. Both/either primary switch 392 and/or secondary switch 390 may be configured to switch from on to off on a synchronist clock or updated by Pulsed drilling controller (PDC) 155. Both/either primary switch 392 and/or secondary switch 390 may be configured to generate any signal function at any rate. In addition, pulsed power circuit 308 may comprise a secondary capacitor 388 which charges, until secondary switch 390 is closed. When secondary switch 390 closes, secondary capacitor 388 is discharged, and pulses of voltage arches across pulsed-power drill bit 114, as described above. In addition, primary switch 392 may be opened and closed. When primary switch 392 is closed, primary capacitor 386 may charge, storing energy. Transformer 384 may be utilized to step up or increase voltage as another boost in voltage across transformer 384.

Pulses of voltage provide power and high voltage on BHA 128 for PG circuit 160. The power provided downhole to PG circuit 160 may be switched on and off by secondary switch 390, resulting voltage arches across pulsed-power drill bit 114, as described above. In addition, PG circuit 160 may comprise an energy storage component (not illustrated). An energy storage component may be configured to be charged by and store pulses of voltage delivered to PG circuit 160. PG circuit may release the stored energy from the energy storage component intermittently or via a clock cycle in any manner.

FIG. 4 illustrates a schematic, for an example pulsed power drill system 300. As illustrated in FIG. 4, at surface 180 pulsed power drill system 300 may comprise DC power supply 302 connected to PDC 155. Further at surface 180 mud pump 125 may be configured to pump at least drilling fluid between annulus 126 (e.g., referring to FIG. 1) and drill string 108. In examples, drill string 108 may comprise coiled tubing with optical fiber communicatively coupled to the telemetry mechanism. In addition, drill string 108 may comprise MV cable 304 configured to deliver power between DC power supply 302 to BHA 128 comprising PG circuit 160. As previously described, PG circuit 160 may comprise boost charger 306 and pulsed power circuit 308 configured to supply power to pulsed-power drill bit 114. Pulsed power drill system 300 as described above relies on a complex and electrically robust BHA 128. This reduces the steering capability and intensifies the thermal requirements of BHA 128. As such, a modified scheme may be employed.

FIG. 5 illustrates an example of a high voltage pulsed power drill system 500 comprising a PG circuit 160 with a high voltage cable. DC power source 302 may be communicatively coupled to pulsed drilling controller (PDC) 155. Herein, DC power source 302 may be disposed on surface 180 and configured to produce a voltage into boost charger 306.

Boost charger 306 may increase the voltage to high voltage and inputs the high voltage into pulsed power circuit 308. Boost charger 306 may be operated with a switching element configured to switch the mode of boost charger 306. In examples, the switching element may implement any example of a transistor comprising but not limited to a MOSFET or a BJT. When the switching element activates a charging mode for boost charger 306, an inductor may be utilized within boost charger 306 to store and release power between different modes of boost charger 306. In addition, boost charger 306 may implement a capacitor to regulate changes in voltage when boost charger 306 is switching between modes. Further, boost charger 306 may incorporate a control circuitry configured to be connected to and controlled by PDC 155. In effect, the component of boost charger 306 may be utilized to receive voltage from DC power supply 302 and output an increased voltage. The increased voltage may be implemented by pulsed power circuit 308. Inductance, Capacitance, and a Transistor.

For example, pulsed power circuit 308 may create pulses of voltage with secondary switch 390 for HV cable 502. Both/either primary switch 392 and/or secondary switch 390 may be configured to switch from on to off on a synchronist clock or updated by Pulsed drilling controller (PDC) 155. Both/either primary switch 392 and/or secondary switch 390 may be configured to generate any signal function at any rate. In addition, pulsed power circuit 308 may comprise a secondary capacitor 388 which charges, until secondary switch 390 is closed. When secondary switch 390 closes, secondary capacitor 388 is discharged, and pulses of voltage are provided for HV cable 502. In addition, primary switch 392 may be opened and closed. When primary switch 392 is closed, primary capacitor 386 may charge, storing energy. Transformer 384 may be utilized to step up or increase voltage as another boost in voltage across transformer 384. Further, the secondary capacitor 338 may be disposed on surface 180 (e.g., referring to FIG. 1), with the rest of pulsed power circuit 308, or downhole, adjacent to the pulsed power drill bit 114.

HV cable 502 may provide an electrical connection between surface 180 and PG circuit 160. In addition, HV cable 502 may comprise a second inductance 582 and second resistance 580. The resulting voltage along HV cable 502 provides power and high voltage on BHA 128 for PG circuit 160. The power provided downhole to PG circuit 160 may be switched on and off by secondary switch 390, resulting voltage arches across pulsed-power drill bit 114, as described above. An energy storage component may be configured to be charged by and store pulses of voltage delivered to PG circuit 160. PG circuit may release the stored energy from the energy storage component intermittently or via a clock cycle in any manner.

Figure 6:
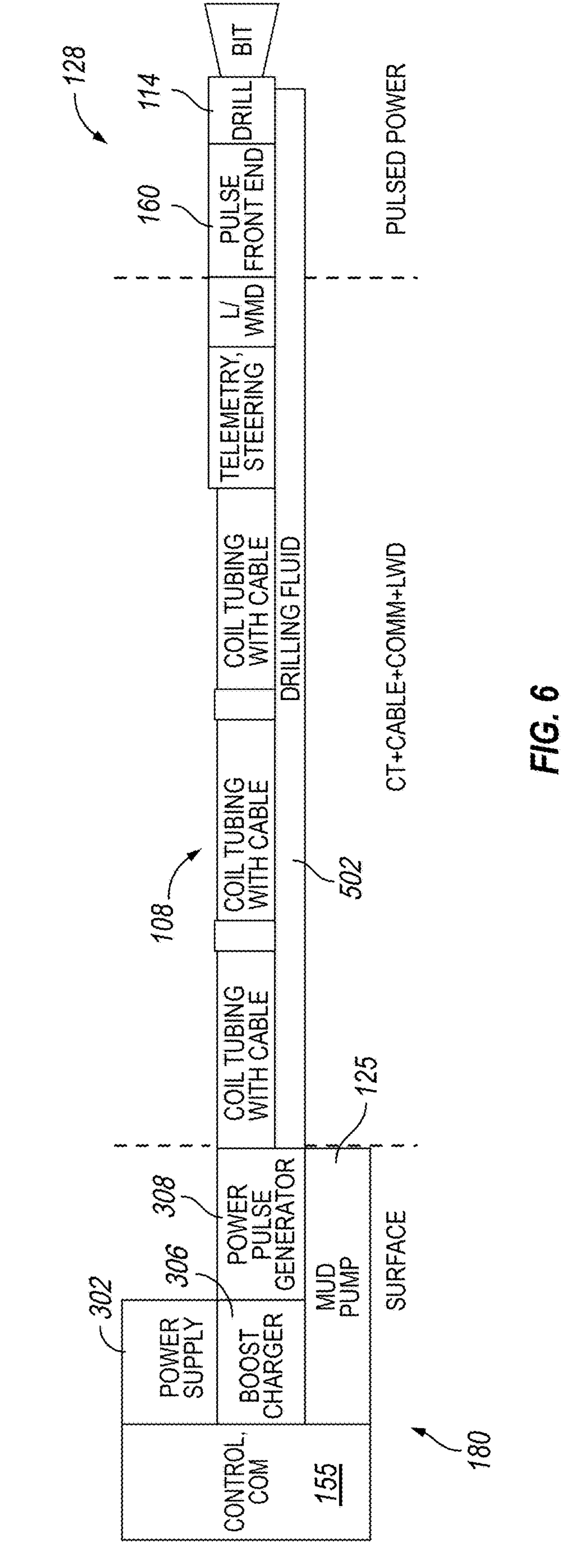
FIG. 6 illustrates a schematic for an example pulsed power drill system with a high voltage cable.

FIG. 6 illustrates a schematic, for an example of updated high voltage pulsed power drill system 600. As illustrated in FIG. 6, at surface 180 pulsed power drill system 200 may comprise DC power supply 202 connected to PDC 155. DC power supply 202 may further be connected to boost charger 306 and boost charger 306 may be connected to pulsed power circuit 308 at surface 180, as discussed above. Further, at surface 180 mud pump 125 may be configured to pump at least drilling fluid between annulus 126 (e.g., referring to FIG. 1) and drill string 108. In examples, drill string 108 may comprise coiled tubing with optical fiber communicatively coupled to the telemetry mechanism. In addition, drill string 108 may comprise HV cable 502 configured to deliver power between pulsed power circuit 308 and BHA 128 comprising PG circuit 160. High voltage pulsed power drill system 500 as described above minimizes the components required on BHA 128. This increases the steering capability and lowers the thermal requirements of BHA 128. In effect, there is a 70% reduction in the length of electrical component on BHA 128 and 85% reduction in power loss. The electrical components on BHA 128 may be further described below.

Figures 7A, 7B:
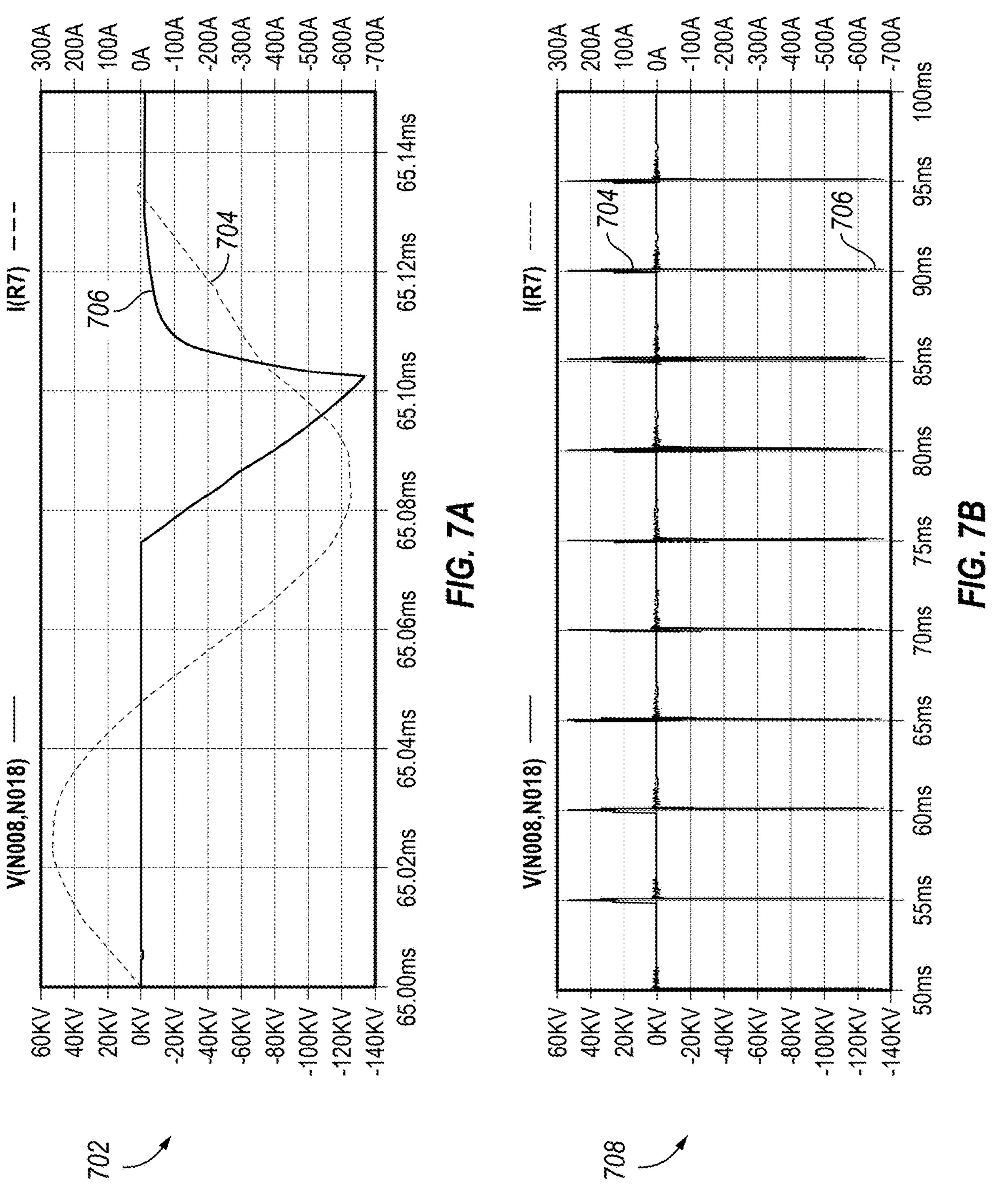
FIG. 7A illustrates an example of a single pulsed for updated pulsed power drill system.
FIG. 7B illustrates a series of pulses 708 for updated pulsed power drill system.

FIG. 7A illustrates an example of a single pulsed 702 for updated high voltage pulsed power drill system 500 (e.g., referring to FIG. 5). As illustrated, current 704 in HV cable 502 during a pulsed may be plotted as a function of current (right dependent axis) over time (independent axis). Additionally, voltage 706 at pulsed-power drill bit 114 may be plotted as a function of voltage (left dependent axis) over time (independent axis). The length of a pulsed may be approximately 0.14 milliseconds. At approximately 0.1 milliseconds diode or time t1 the voltage is cut off and discharged for drilling purposes. FIG. 7B illustrates a series of pulses 708 for high voltage pulsed power drill system 500. Each pulsed from the series of pulses 708 may be spaced every 5 milliseconds and identical to single pulsed 702. Current 704 in HV cable 502 may be plotted as a function of current (right dependent axis) over time (independent axis) and voltage 706 at pulsed-power drill bit 114 may be plotted as a function of voltage (left dependent axis) over time (independent axis).

Methods and systems herein may generally relate to methods and systems for transmitting power downhole for a pulsed power drilling scheme. Generally, methods and systems proposed may be applied for transmitting power downhole for a pulsed power drilling scheme. Methods and systems herein are applied in such a way that most of the converter section is moved to the surface 180 (e.g., referring to FIG. 1). The implementation of only a secondary capacitor and an output diode along with sensing electronics are assembled in the BHA just above the drill bit. This implementation swaps the voltage converter from a downhole position to a positioned at the surface 180. Additionally, a high voltage cable may support more than replaces the current medium voltage cable. This allows an ease in the circuitry and implementation of components at the surface 180 rather than downhole. This is an advantage because utilizing components and circuitry is a burden on other downhole components, and it may be difficult to fix defective components and circuitry downhole. Components and circuitry disposed on the surface 180 are easy to access and do not interfere with downhole components.

The preceding description provides various examples of the systems and methods of use disclosed herein which may contain different method steps and alternative combinations of components. It should be understood that, although individual examples may be discussed herein, the present disclosure covers all combinations of the disclosed examples, comprising, without limitation, the different component combinations, method step combinations, and properties of the system. It should be understood that the compositions and methods are described in terms of "comprising," "containing," or "comprising" various components or steps, the compositions and methods may also "consist essentially of" or "consist of" the various components and steps. Moreover, the indefinite articles "a" or "an," as used in the claims, are defined herein to mean one or more than one of the elements that it introduces. The systems and methods may comprise any of the various features disclosed herein, comprising one or more of the following statements.

Statement 1. A system comprising: a pulsed power drill bit comprising one or more electrodes; a pulse-generating (PG) circuit configured to provide an electric potential across the one or more electrodes; a boost charger configured to charge an energy storage component in the PG circuit; and a power supply configured to provide voltage to the PG circuit.

Statement 2. The system of statement 1, further comprising a cable configured to connect the power supply to the PG circuit.

Statement 3. The system of statement 2, wherein the cable supplies voltage between ranges of 100V-1 kV, 1 kV-10 kV, 10 kV-100 kV, 1 kV-10 kV, 10 kV-100 kV, or 100 kV-1,000 kV.

Statement 4. The system of statement 2, wherein the boost charger configured to increases the voltage from the power supply.

Statement 5. The system of statement 4, wherein the boost charger is disposed on the surface.

Statement 6. The system of statement 5, wherein the boost charger comprises at least a switching element, an inductor, and a capacitor.

Statement 7. The system of statement 4, further comprising a pulsed power circuit configured to generate a pulsed of voltage at any signal function at any rate to the cable.

Statement 8. The system of statement 7, wherein the pulsed power circuit comprises at least a primary switch, a primary capacitor, a transformer, a secondary switch, and a secondary capacitor.

Statement 9. The system of statement 8, wherein the pulses power circuit further comprises a secondary capacitor disposed on the surface or downhole, adjacent to the pulsed power drill bit.

Statement 10. The system of statement 7, wherein the pulsed power circuit is disposed on the surface.

Statement 11. The system of statement 1, wherein voltage from the one or more electrodes forms an arc from the pulsed power drill bit across a drilling fluid proximate to a distal end of a wellbore.

Statement 12. A method comprising: disposing a pulsed power drill bit comprising one or more electrodes downhole; providing an electric potential across the one or more electrodes with a pulse-generating (PG) circuit; charging an energy storage component in the PG circuit with a boost charger configured to charge an energy storage component in the PG circuit; and providing voltage to the PG circuit with a power supply.

Statement 13. The method of statement 12, further comprising connecting the power supply to the PG circuit with a cable.

Statement 14. The method of statement 13, wherein the cable supplies voltage between ranges of 100V-1 kV, 1 kV-10 kV, 10 kV-100 kV, 1 kV-10 kV, 10 kV-100 kV, or 100 kV-1,000 kV.

Statement 15. The method of statement 13, further comprising increasing voltage from the power supply with the boost charger.

Statement 16. The method of statement 15, wherein the boost charger is disposed on the surface.

Statement 17. The method of statement 16, wherein the boost charger comprises at least a switching element, an inductor, and a capacitor.

Statement 18. The method of statement 17, further comprising generating a pulsed of voltage at any signal function at any rate to the cable with a pulsed power circuit.

Statement 19. The method of statement 18, wherein the pulsed power circuit comprises at least a primary switch, a primary capacitor, a transformer, a secondary switch, and a secondary capacitor.

Statement 20. The method of statement 19, wherein the pulses power circuit further comprises a secondary capacitor disposed on the surface or downhole, adjacent to the pulsed power drill bit.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any comprised range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A system comprising:
- a pulsed power drill bit comprising one or more electrodes;
- a pulse-generating (PG) circuit configured to provide an electric potential across the one or more electrodes;
- a boost charger configured to charge an energy storage component in the PG circuit, wherein the boost charger is disposed on s surface; and
- a power supply configured to provide voltage to the PG circuit.

2. The system of claim 1, further comprising a cable configured to connect the power supply to the PG circuit.

3. The system of claim 2, wherein the cable supplies voltage between ranges of 100V-1 kV, 1 kV-10 kV, 10 kV-100 kV, 1 kV-10 kV, 10 kV-100 kV, or 100 kV-1,000 kV.

4. The system of claim 2, wherein the boost charger configured to increases the voltage from the power supply.

5. The system of claim 4, further comprising a pulsed power circuit configured to generate a pulsed of voltage at any signal function at any rate to the cable.

6. The system of claim 5, wherein the pulsed power circuit comprises at least a primary switch, a primary capacitor, a transformer, a secondary switch, and a secondary capacitor.

7. The system of claim 6, wherein the pulses power circuit further comprises the secondary capacitor disposed on the surface or downhole, adjacent to the pulsed power drill bit.

8. The system of claim 5, wherein the pulsed power circuit is disposed on the surface.

9. The system of claim 1, wherein the boost charger comprises at least a switching element, an inductor, and a capacitor.

10. The system of claim 1, wherein voltage from the one or more electrodes forms an arc from the pulsed power drill bit across a drilling fluid proximate to a distal end of a wellbore.

11. A method comprising:
- disposing a pulsed power drill bit comprising one or more electrodes downhole;
- providing an electric potential across the one or more electrodes with a pulse-generating (PG) circuit;
- charging an energy storage component in the PG circuit with a boost charger configured to charge an energy storage component in the PG circuit, wherein the boost charger is disposed on a surface; and
- providing voltage to the PG circuit with a power supply.

12. The method of claim 11, further comprising connecting the power supply to the PG circuit with a cable.

13. The method of claim 12, wherein the cable supplies voltage between ranges of 100V-1 kV, 1 kV-10 kV, 10 kV-100 kV, 1 kV-10 kV, 10 kV-100 kV, or 100 kV-1,000 kV.

14. The method of claim 12, further comprising increasing voltage from the power supply with the boost charger.

15. The method of claim 11, wherein the boost charger comprises at least a switching element, an inductor, and a capacitor.

16. The method of claim 15, further comprising generating a pulsed of voltage at any signal function at any rate to the cable with a pulsed power circuit.

17. The method of claim 16, wherein the pulsed power circuit comprises at least a primary switch, a primary capacitor, a transformer, a secondary switch, and a secondary capacitor.

18. The method of claim 17, wherein the pulses power circuit further comprises the secondary capacitor disposed on the surface or downhole, adjacent to the pulsed power drill bit.

19. A system comprising:
- a pulsed power drill bit comprising one or more electrodes;
- a pulse-generating (PG) circuit configured to provide an electric potential across the one or more electrodes;
- a boost charger configured to charge an energy storage component in the PG circuit;
- a power supply configured to provide voltage to the PG circuit; and
- a pulsed power circuit configured to generate a pulsed of voltage at any signal function at any rate to the cable wherein the pulsed power circuit comprises at least a primary switch, a primary capacitor, a transformer, a secondary switch, and a secondary capacitor.

* * * * *